Sept. 11, 1934.  O. D. H. BENTLEY  1,973,554
ELASTIC FLUID TURBINE
Filed March 1, 1930
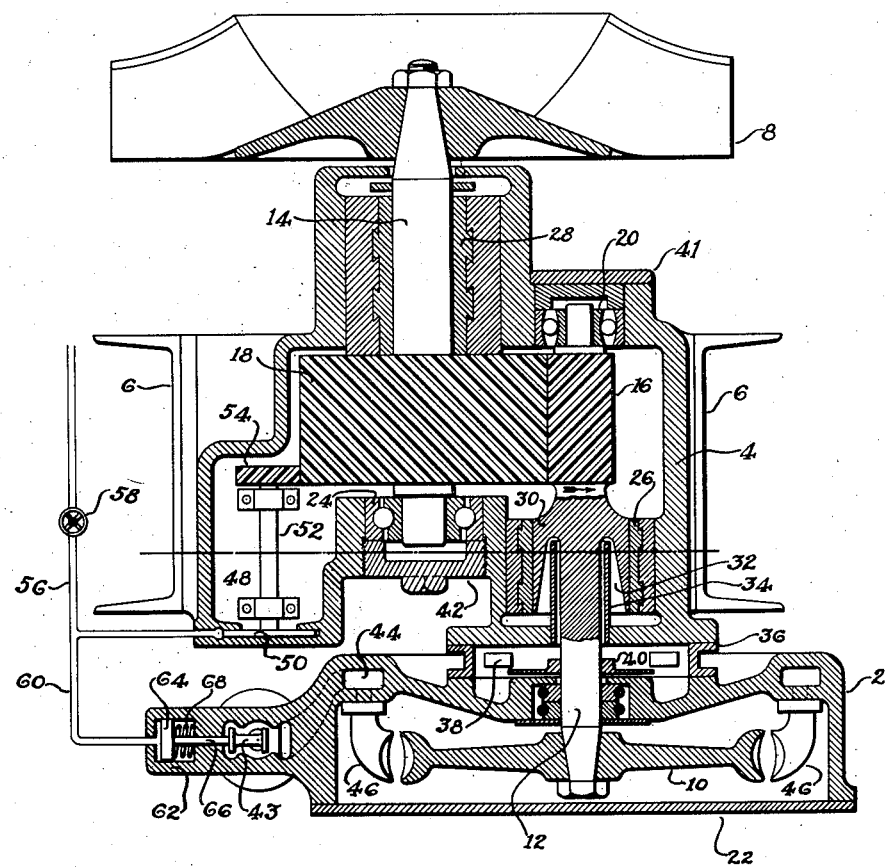

Patented Sept. 11, 1934

1,973,554

UNITED STATES PATENT OFFICE 1,973,554

ELASTIC FLUID TURBINE

Oliver D. H. Bentley, Norfolk, Mass., assignor to B. F. Sturtevant Company, Hyde Park, Mass., a corporation of Massachusetts Application March 1, 1930, Serial No. 432,472

2 Claims. (Cl. 74—424.5)

The present invention relates to elastic fluid turbines and to methods of governing the same.

The objects of the present invention are to provide an elastic fluid turbine of simple, efficient and durable construction, and also to provide a simple and effective method and means of governing the speed.

With this object in view, the present invention consists of the turbine and method of governing the same hereinafter described and particularly defined in the claims.

The accompanying drawing is a sectional elevation of the preferred form of turbine embodying the present invention.

The illustrated embodiment of the invention is a turbo-blower, comprising a turbine and a fan both arranged to rotate in horizontal planes and connected by vertical shafts. In the accompanying drawing, the turbine casing 2 is mounted beneath the gear casing 4 which is supported between channels 6. The blower 8 is mounted above the gear casing. The turbine has a rotor 10 to which is connected a vertical driving shaft 12. The blower is mounted on a driven shaft 14. The driving and driven shafts are connected by helical, speed-reducing gears 16 and 18.

The driving shaft 12 is provided at its upper end, that is, at the end opposite the rotor, with a ball thrust bearing 20. The shaft is supported by the bearing and at its lower end terminates immediately above a closure plate 22 forming a part of the turbine casing. The gears are so constructed that when the unit is operated, a thrust is imparted to the driving shaft to force it upwardly against the thrust bearing, that is to say, in operation, the turbine shaft is intended to float. The driven shaft 14 is provided at its lower end with a ball thrust bearing 24, toward which the shaft is forced by the reaction of the helical gears.

The shafts 12 and 14 are journaled in sleeve bearings 26 and 28 respectively, each of which is located between its gear and the driving or driven element respectively. The driving shaft is enlarged at 30 to afford a bearing surface therefor and the enlargement is provided with a downwardly extending, undercut annular recess 32. Into the recess extends a stationary cylindrical oil guard 34 which is secured to the lower face of the gear casing. The gear casing is filled with oil to the level indicated in the drawing and means are provided for feeding oil to the bearing surfaces. The provision of the oil guard 24 prevents passage of oil downwardly into the rotor.

The rotor casing 2 is connected to the gear casing by means of a ring 36 which is provided with ventilating openings 38. Any oil which accidentally passes the oil guard 34 is prevented from entering into the turbine casing by means of a disk 40 secured to the shaft within the ring 36. Any oil flowing downwardly along the shaft is dispelled from the disk 40 by centrifugal force. The same action is availed of to prevent the leakage of steam from the rotor upwardly into the oil.

In operation, the turbine floats because of the upward thrust imparted by the helical gears. The gears are of the single helical type which permit an axial movement of the turbine shaft. The upward thrust neutralizes the weight of the turbine and conduces to long wear of the bearing 20. It will be noted that downward thrust is applied to the driven shaft 14, but any disadvantage due to this fact is more than compensated by the relief from wear on the bearing 20, which operates at much higher speed than the driven shaft bearing 24.

Access to the bearing 20 is gained through a removable plate 41, and to the bearing 24 through a removable threaded cap 42.

Steam is supplied to the turbine through a balanced valve 43 which communicates with an annular steam chest 44 connecting with the nozzles 46. The speed of the turbine is governed and adjusted in accordance with variations in the oil pressure maintained in the lubricating system, presently to be described.

The gear casing is formed at one side with an oil well 48 having at the bottom an oil pump 50 of the impeller type, driven by a shaft 52 having at its upper end a helical gear 54 meshing with the gear 18. Oil is forced by the impeller through a lubricating oil line 56 to the various bearing surfaces of the turbine in the usual manner. The flow of oil is controlled by a manually operated valve 58 which also serves to control the governed speed of the turbine.

A branch oil line 60 runs from the lubricating line 56 to a cylinder 62 having a piston 64 connected by a rod 66 with the balanced steam valve 43. The piston 64 is normally pressed to maintain the valve in open position by a spring 68. The pressure of the oil in the branch 60 opposes the force of the spring and tends to move the valve toward closed position. The lubricating system, therefore, acts as a governor to maintain a constant speed on the turbine. If the speed increases, the oil pressure in the entire oil system increases, thereby partially closing the steam valve and restoring the speed to approximately its original value, and conversely, a decrease in speed opens the steam valve by the decrease in lubricating pressure.

The manually operated valve 58 affords a convenient control of the speed at which it is desired to operate the turbine. The pressure in the branch line 60 depends not only upon the speed of the impeller, but also upon the resistance to oil flow in the parallel lubricating line 56. By closing the valve 58 and interposing resistance in the lubricating line, the pressure in the branch line 60 will be increased, thereby tending to close the steam valve and reduce the turbine speed. The speed at which the turbine will operate may be increased by opening the valve 58, thereby decreasing the resistance in the lubricating line, and decreasing the pressure in the branch line 60. For each setting of the valve 58, the turbine will operate to govern at a definite and practically fixed speed.

It will be understood that the oil pressure throughout the system is sufficient to maintain proper lubrication at all times, even when the valve 58 is nearly closed, especially when it is considered that with partial or nearly complete closure of the valve, the turbine operates at its lowest speeds. If the lubricating oil line 56 becomes stopped for any reason, the turbine immediately slows down to a very low speed, thereby preventing damage upon failure of lubrication, and also giving warning that the lubrication system is out of order.

Having thus described the invention, what is claimed is:

1. The combination with a high-speed motor having a horizontal rotor and a vertical driving shaft extending upwardly from the rotor, a thrust bearing for the driving shaft, a low-speed driven shaft having a supporting thrust bearing, and a single pair of helical, speed reducing gears connecting said shafts by being meshed with each other, the helical angle of the teeth of said gears and their direction of rotation being such as to entirely take the weight of the rotor and its connected parts off the thrust bearing of the rotor shaft at normal speeds and transfer it to the thrust bearing of the low-speed driven shaft.

2. The combination with a high-speed motor having a horizontal rotor and a vertical driving shaft extending upwardly from the rotor, a thrust bearing for the driving shaft, a low-speed driven shaft having a supporting thrust bearing, a single pair of helical, speed reducing gears connecting said shafts by being meshed with each other, the helical angle of the teeth of said gears and their direction of rotation being such as to entirely take the weight of the rotor shaft at normal speeds and transfer it to the thrust bearing of the low-speed driven shaft, and means whereby the rotor shaft is slidingly supported at a point intermediate its ends.

OLIVER D. H. BENTLEY.